(12) United States Patent
Kim et al.

(10) Patent No.: US 8,935,533 B2
(45) Date of Patent: Jan. 13, 2015

(54) METHOD AND APPARATUS FOR A SCALABLE AND SECURE TRANSPORT PROTOCOL FOR SENSOR DATA COLLECTION

(75) Inventors: Young Jin Kim, Basking Ridge, NJ (US); Vladimir Kolesnikov, Jersey City, NJ (US); Marina K. Thottan, Westfield, NJ (US)

(73) Assignee: Alcatel Lucent, Boulogne Billancourt (FR)

( * ) Notice: Subject to any disclaimer, the term of this patent is extended or adjusted under 35 U.S.C. 154(b) by 161 days.

(21) Appl. No.: 13/331,102

(22) Filed: Dec. 20, 2011

(65) Prior Publication Data
US 2013/0159724 A1 Jun. 20, 2013

(51) Int. Cl.
*H04L 29/06* (2006.01)
*H04L 9/08* (2006.01)
*H04L 9/32* (2006.01)

(52) U.S. Cl.
CPC ............ *H04L 8/0811* (2013.01); *H04L 9/0819* (2013.01); *H04L 9/0838* (2013.01); *H04L 9/3297* (2013.01); *H04L 9/0813* (2013.01)
USPC ..................................................... 713/181

(58) Field of Classification Search
CPC ............ H04L 29/06775; H04L 9/0811; H04L 9/0813; H04L 9/0819; H04L 9/0838; H04L 9/3297
USPC ............... 380/44, 285; 726/1–6, 26; 713/168, 713/171, 189
See application file for complete search history.

(56) References Cited

U.S. PATENT DOCUMENTS

| | | | |
|---|---|---|---|
| 7,673,142 B2* | 3/2010 | Jeffries et al. | 713/169 |
| 8,422,687 B2* | 4/2013 | Oksman et al. | 380/279 |
| 2007/0174614 A1* | 7/2007 | Duane et al. | 713/168 |
| 2008/0195740 A1* | 8/2008 | Lowell et al. | 709/229 |

OTHER PUBLICATIONS

Immamoto et al., "A Design of Diffie-Hellman Based Key Exchange Using One-time ID in Pre-shared Key Model", pp. 327-332, Advanced Information Networking and Applications, 2004, AINA, 2004. 18th International Conference on.*
Bellare et al., "Authenticated Key Exchange Secure Against Dictionary Attacks", Advances in Crytology Eurocrypt'00, LNCS vol. 1807. Springer-Verlag (2000) 139-155.*

* cited by examiner

*Primary Examiner* — Kambiz Zand
*Assistant Examiner* — Hee Song
(74) *Attorney, Agent, or Firm* — M. J. Hodulik (57) ABSTRACT

A new approach for a transport protocol for sensor data collection, such as a smart grid is described. In one embodiment of the invention, each server avoids keeping security and communication state per client through the notion of a secure "state-token". The state token is issued with each server message and is subsequently attached to corresponding client messages delivered to the server. An implementation is provided in which the server encrypts and authenticates the associated session state, and then gives the resulting encryption for the client to temporarily store and return to the server with a next message. In this way, a server does not keep session state after sending the encryption back to a client and can quickly restore session state when the next message from the client arrives.

20 Claims, 4 Drawing Sheets

METHOD AND APPARATUS FOR A SCALABLE AND SECURE TRANSPORT PROTOCOL FOR SENSOR DATA COLLECTION

TECHNICAL FIELD

This invention relates generally to communications systems and more particularly to data collection systems for machine-to-machine communications, such as a smart electrical grid.

BACKGROUND OF THE INVENTION

The limited communication and security capability of non-IP based networks, currently deployed in utility power grids, are crucial impediments to future smart grid deployments aimed at improving energy efficiency, resiliency against power flow disruptions, and reducing carbon emissions by incorporating renewable energy sources. Therefore, the power industry is undergoing a major network transformation by designing a new IP-based smart grid communication network with enhanced security and reliability.

One distinguishing aspect of the smart grid communication network is the large-scale deployment of sensors and smart meters which send periodic updates to the utility control center; for example, in Manhattan, N.Y., several million meters must be deployed to cover all customer households. The IP network being deployed is expected to transport the sensor data in a trustworthy (secure and reliable) fashion to the utility's control centers, where the data will be used to evaluate the grid state, and current electricity consumption. However, the sensors that generate the data are typically computationally constrained entities.

Sensor data collection is an integral part of smart grid communications. The data traffic generated from sensors or meters, which are typically located beyond utility security perimeters, is expected to be carried over a purpose-built utility network. The purpose-built utility network is isolated from the highly critical SCADA-based communication network. It is also isolated from the public Internet because of the significant security and availability issues that are encountered when utility data traffic is multiplexed with Internet data traffic.

The general characteristics of smart grid sensor data can be described as follows. First, data is carried over semi-permanent security and transport associations between sensors and utility side servers. Second, on the purpose-built utility network, data toward utility (north-bound data), such as meter readings, is periodically collected; in contrast, data originating from the utility (south-bound data), such as management information, is relatively rare. This implies that north-bound data would dominate network resource consumption, as compared with south-bound data. Third, north-bound data must be delivered in a reliable and timely fashion for precise estimation of instability induced conditions like a large mismatch between actual electricity usage and electricity supply based on day-ahead demand prediction. Comparatively, south-bound data to sensors or meters is not critical for reliable and timely delivery, since this information can be easily overridden by new data. Fourth, secure communication ensuring data credibility is necessary for safe power grid operations. We note that security requirements do not need to be symmetric. For example, authentication is mandatory for delivering the southbound electricity price information, but there is no requirement for confidentiality. In contrast, for the north bound metered data, both authentication and confidentiality are critical. Lastly, field sensors are unlikely to have a full set of operating systems and protocol stacks due to limited computation resources, while utility-side servers have plentiful computing resources to deal with the significant amount of data received from the large number of deployed sensors. For example, the TI MSP 430 microcontroller series adopted in many sensor hardware platforms feature 2-18 KB RAM, 1-256 KB EPROM, and 8-16 MHz CPU: a subset of OS and protocol features can be installed for the platforms; however, due to lack of storage space, data has to be delivered to servers in a utility network. To the best of the inventors' knowledge, there is no published protocol that accommodates above data transport requirements in a scalable and lightweight manner.

SUMMARY OF THE INVENTION

An advance is made over the prior art in accordance with the principles of the present invention that is directed to a new approach for a transport protocol for sensor data collection, such as a smart grid. In one embodiment of the invention, each server avoids keeping security and communication state per client through the notion of a secure "state-token". The state token is issued with each server message and is subsequently attached to corresponding client messages delivered to the server. An implementation is provided in which the server encrypts and authenticates the associated session state, and then gives the resulting encryption for the client to temporarily store and return to the server with a next message. In this way, a server does not keep session state after sending the encryption back to a client and can quickly restore session state when the next message from the client arrives.

In certain embodiments of the invention, a method and system for secure communication between a client and a server in a communications network are described. The method includes sending a connection request from the client to the server and receiving from the server an acknowledgement message, where the acknowledgement message includes a state token representing a state of association between the client and the server. Communication takes place from the client to the server utilizing the state token, wherein the state of association between the client and the server is stored temporarily at the client and not maintained at the server. The state token is utilized in communications from the client to the server to enable the server to verify and restore session state between the client to thereby process messages from the client.

BRIEF DESCRIPTION OF THE DRAWING

The teachings of the present invention can be readily understood by considering the following detailed description in conjunction with the accompanying drawings, in which.

DETAILED DESCRIPTION

Embodiments of the present invention relate to a scalable and secure transport protocol SSTP for smart grid data collection. In certain embodiments, an important aspect of SSTP is that a server does not need to maintain any state (for security and communication) on a per client basis. An inherent and lightweight security scheme for the SSTP protocol is provided, thus removing the costly dependency on support for TLS or IPSec. In addition, a state-token concept is disclosed that enables scalable stateless server deployments for data collection. One important security and transport benefit of implementing a stateless server is that SYN (synchronize message, the connection request in TCP) flooding from a large number of clients induced by server restarts or failures can be avoided. Referring to Table 1, we review some of the features of current transport and security protocols, and highlight the necessity for design of a novel scalable transport protocols for smart grid data collection. Based on the review, it can be shown that the existing transport protocol do not meet the security and reliability characteristics of the smart grid sensor data network in a scalable and lightweight manner.

TABLE I

FEATURES OF TRANSPORT PROTOCOLS.

| Features | TCP | SCTP | SSTP |
|---|---|---|---|
| Security Schemes | TLS or IPSec | TLS or IPSec | Inherent built-in |
| Flooding Attacks | Cookie [5-6] | Cookie [7] | Cookie [6] |
| Connection Establishment | Three-way handshake | Four-way handshake | Four-way handshake |
| Duplex Comm. | Yes | Yes | Mostly simplex |
| Reliable Delivery | ACK with SACK | ACK with SACK | ACK |
| In-ordered delivery | Mandatory | Optional | None |
| Sender-side delay | Congestion Control | Congestion Control | None |
| Receiver-side delay | Delayed ACK | Delayed ACK | None |
| Flow Control | Receiving window | Receiving window | Sending window |
| Transmission or Reception Buffer | 128 KB per connection[3] | 128 KB per connection | Chosen by applications |
| Multi-homing stream | No | Yes | No |

With regard to Security and Scalability, it can be seen from Table I, that none of the well-known protocols has inherent data authentication and confidentiality extensions to prevent eavesdropping, tampering, or message forgery. Instead, external mechanisms such as TLS or IPSec are typically employed for ensuring data security. This is not problematic in itself; however this results in significant overhead in terms of negotiation procedures to accommodate low computing capable end devices. In addition, there is a concern as to whether TCP and SCTP can address end-to-end security for large-scaled and lifetime-lived communication environments in a scalable manner. Consider hourly meter readings in New York City. From a networking aspect, meters send measured data to either a far-side utility control center (UCC) or near-by aggregators from where the data is forwarded to the utility UCC (split-aggregation). In the former case, for a given number N of meters, a UCC must either permanently keep O(N) states (security info, tx/rx buffer, connectivity info) or process O(N) secure connection requests per hour for meter readings. Neither of these approaches can avoid scalability concerns and single point of bottlenecks/failures in the UCC. On the other hand, the split-aggregation approach may be better with respect to performance and scalability. Unfortunately, this approach compromises the end-to-end confidentiality as it cannot maintain a TLS (or IPSec) session that spans from meters to UCC. Thus, data has to be decrypted at the aggregators and then encrypted again. Additionally, the overhead (memory footprint and CPU load) required for executing TLS along with either TCP or SCTP is expensive for resource-constrained end devices.

Regarding Availability and Scalability, existing well-known connection-oriented transport protocols may incur SYN flooding when a utility-side server associated with a large number of sensors or meters is abruptly restarted or failed. All sensors associated with this server will simultaneously send thousands of connection requests to the server to reestablish their security associations with the utility as soon as possible. It would happen immediately after a restart or a power outage, regardless of the need to send any data to the UCC. Thus, transport protocols for smart grid data collection must address the SYN flooding problem and also be able to scalably manage lifetime-lived associations.

With respect to TCP Latency & Reliability, in-order sequenced delivery of TCP can significantly increase latency under frequent packet drop in routers or packet loss over wireless links. TCP receivers buffer those received segments that are higher than the expected sequence number. This prevents the data from being delivered to a corresponding application until a segment having the expected sequence number arrives. This re-sequencing delay in the receiver results in increased end-to-end latency. However, in order delivery is not required for smart grid data transport as data is always time-stamped at the sender side. Note that in order delivery can be disabled in SCTP, as shown in Table I. Delayed acknowledgement typically enabled by default in TCP Reno or later versions reduces the number of ACKs to be sent-back to senders, and, accordingly, throughput and resource utilization are highly improved. However it can still increase the latency by up to 40 ms under periodic data delivery for data sizes that are smaller than the maximum segment size (MSS). Typically, sensor data size is no more than 1 KB. For avoiding this receiver-side-induced latency problem, the delayed ACK timeout (in Linux, /proc/sys/net/ipv4/tcp_delack_min) can be reduced by administrators, but this is not a recommended action as manipulating the option can degrade performance.

TCP enables reliable delivery by using the cumulative acknowledgement scheme. Thus, it follows that average TCP end-to-end delay is more than one RTT (Round-Trip Time) even under ideal network conditions, where no packet is dropped or lost, and there is no delay caused by flow control due to the large sliding window size on the receiver side. TCP congestion control schemes can prolong delivery latency in the face of packet drop or loss. The sender-side retransmits lost segments after receiving either three duplicated acknowledgements received (fast recovery) or a timeout is expired (slow start). These schemes were devised for avoiding unnecessary retransmissions by discriminating between lost segments and late-arriving segments which took a longer path (it can occur due to IP routing protocols such as OSPF or BGP).

Thus, the sender-side by design increases the retransmission delay. The TCP congestion control algorithm limits the data injection speed until the network recovers from the congestion event. Selective acknowledgement schemes combined with the cumulative acknowledgement schemes deal with latency issues by quickly recovering multiple lost segments. However, the first among recovered segments has no performance gain as its delivery is tried only after the receipt of three duplicate acknowledgements.

With regard to Latency, Heavyweightness, & NAT-unfriendliness of SCTP, SCTP was devised to deliver aggregated telephony messages between high-powered telecommunication systems with multiple line cards. For avoiding line blocking in one multistreamed connection, in-order sequenced delivery is disabled in SCTP and thus the buffering delay in the receiver side is reduced. However, SCTP is not completely free of the latency issues of TCP, due to the congestion control and delayed ACK implementation inherited from TCP. Also, it is unlikely that SCTP can run on sensors or meters with limited computing resources (e.g., 10 KB RAM), as even the SCTP lightweight version is relatively heavy in terms of memory usage and CPU load for message processing. Moreover, a recent report shows that the choice of SCTP must be made carefully under environments with NAT (Network Address Translation) traversal. Most currently deployed NAT boxes are not SCTP friendly. However, due to its high assurance features, SCTP may be a good transport candidate for some smart grid applications, such as substation automation, requiring multi-homed communications between the UCC and the substations.

Based on this review we conclude that existing transport protocols are insufficient to address the transport characteristics of the smart grid sensor network.

SSTP

The smart grid sensor network typically consists of measurement data whose size is such that it can be contained in one protocol message without being segmented into multiple chunks. This means that traffic flow-based semantics employed in most known transport protocols are inappropriate. Also, since the data is carried over a purpose-built utility network, packets are rarely lost due to congestion. This means that a congestion control scheme is also not required for the data collection.

One goal for SSTP is scalability both in terms of security and communications. Due to the special communication patterns of data collection—a large number of clients infrequently communicating with servers, we identify the following avenues for significant optimizations.

First, we consider symmetric-key-based protocols. In data collection, clients only talk to the server, and one pre-shared key (PSK) per client will suffice. In this setting, the use of costly public-key credentials will not bring its benefit of system-wide reduction of the number of keys. Since symmetric key operations are hundreds of times faster than public-key operations, SSTP uses only symmetric-key operations for security extensions. In one embodiment of the invention, we include the authenticated Diffie-Hellman (DH) key agreement, E. Rescorla, "Diffie-Hellman Key Agreement Method," IETF RFC 2631, June, 1999, to achieve perfect forward secrecy (PFS)—resilience of completed key exchange sessions to possible future PSK compromise. We note that public-key operations of DH can be avoided at the security cost of not achieving PFS.

We next consider a server's state independent of the number of clients. In data collection such as meter readings, the server must continuously maintain associations with a very large number of clients, who communicate periodically-but-infrequently. Maintaining such associations is very taxing on system resources, if, as is standard in practice and research protocols, the server in fact keeps security and transport information associated with the session (keys, counters, and so on.). In one embodiment, we provide a lightweight (both for client and the server) implementation which encrypts and authenticates the associated session state, and then gives the resulting encryption for the client to temporarily store and return it to the server with the client's next message. In this way, a server does not keep session state after sending the encryption back to a client and can quickly restore it when the next message from the client arrives. Note that our idea can avoid extreme overloading in the face of server restart or failures. As implicitly shown in Table I, the design principle of SSTP is the achievement of lightweight and secure transport protocol implementation to provide affordable end-to-end solutions for resource-constrained devices which find it hard to accommodate known-but-heavy security and transport schemes.

Pre-Shared Key Based Authenticated Key Exchange (AKE)

As is common in secure communications, certain embodiments of the present invention operate with long-term keys and session keys. Long-term keys are long-lived credentials; in our case they are pre-shared keys (PSK) that each client and server had agreed on before they entered the system. PSKs are not used for secure data transport (as it is expensive to replace them when compromised) and are instead used as input to an AKE (Authenticated Key Exchange), a two-party protocol, which allows participants, upon mutual authentication, to securely and privately determine one session key. The output of the AKE, the session key, is then used for securing data transport between the participants.

It should be noted that nowadays an electricity consumer chooses his or her electricity supplier only on a long-lived contract basis and thus a PSK-based AKE suffices for security. However, in the near future, the frequent and dynamic spin across utilities would be possible: e.g., daily selection of electricity supplier. In that setting, SSTP can employ a certificate-based AKE to allow each client device to securely communicate with a plurality of utilities.

With regard to pre-shared key assignment, following our goal of achieving server storage independent of the number of clients, we describe how a server can efficiently store a large number of clients' long-term keys. One aspect is to have these keys not be truly random, but, rather, pseudo-randomly generated from the server's master key k. That is, given a server's master key k, for a client with identity id, we set its long-term key $k_{id}=AES_k$ (id), where the (AES) Advanced Encryption Standard function above can be substituted by any suitable pseudorandom function generator (PRFG). Each client with identity id is then provisioned, e.g., at the time of manufacture, with $k_{id}$. The server need not store this key, as the server can readily generate it, given the server's master key and the client's identity. Security properties of PRFG guarantee that none of the client keys can be distinguished from a random string, even if the adversary obtains keys of all other clients. Thus, these keys are considered to have adequate security characteristics for the intended use.

Connection Establishment with Diffie-Hellman (DH) Exchange is addressed next. For a client-server pair, a secure transport connection is established through the four-way handshake procedure shown in FIG. 1. As shown, for a client B, a connection establishment procedure with server A is illustrated. All messages between clients and servers during the connection establishment phase are protected by a message authentication code (MAC), computed with the PSK $k_B$ on the corresponding message (denoted by $MAC_{kB}$). Also a symmetric session key between a client-server pair is computed by the DH key exchange providing protection against some dictionary attacks and ensuring perfect forward secrecy.

Figure 1:
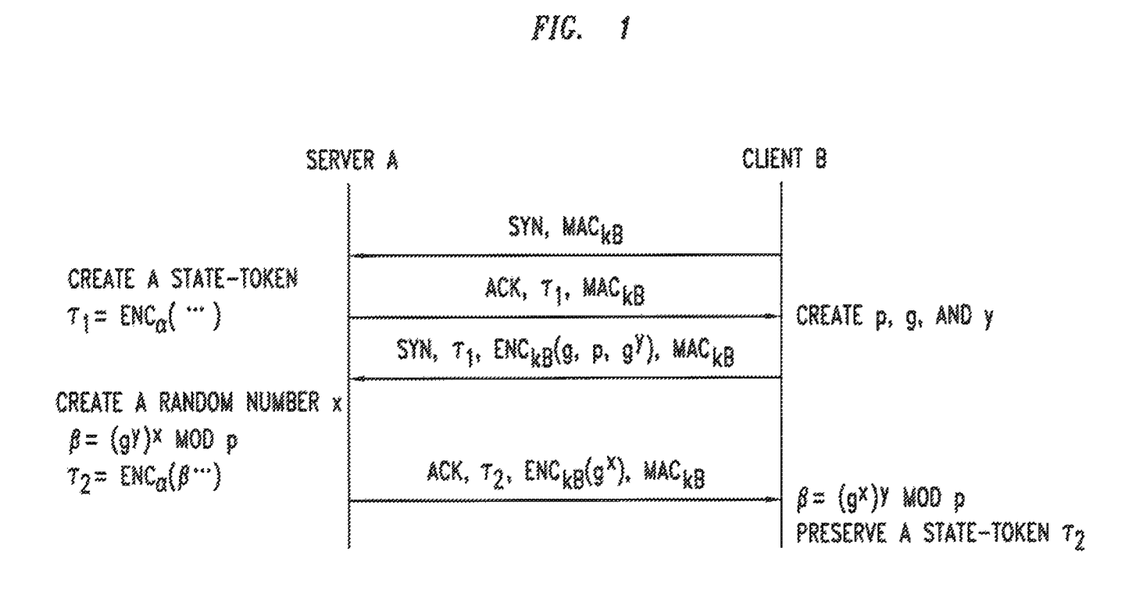
FIG. 1 shows an exemplary embodiment of a connection establishment methodology for the transport protocol of the present invention.

FIG. 1 shows client B intending to establish a secure transport connection with server A. B sends a SYN (the connection request in TCP) message. If server A receives the SYN message that is missing the state-token (the detail of state-token will be discussed next), it creates a new state-token $\tau_1$ and sends back an ACK message with state-token $\tau_1$. When client B gets the ACK message, prime p, generator g, and secret exponent y are randomly generated, wherein certain constraints may apply. For example, with respect to p, there is a constraint of primality for prime p. In that regard, each client sensor may include, for example, a software based random number generator or function which is capable of running on the client processor. It is understood that those persons skilled in the art would understand the required bit-sizes of the numbers for sufficient security of differing applications in this context. Client B sends new SYN message containing state-token $\tau_1$ and a set of numbers (p, g, and exponential $g^x$) encrypted with PSK $k_B$. When server B gets the SYN message, it can decrypt the numbers using PSK $k_B$, and compute a symmetric session key $\beta = g^{yx} \mod p$ from $g^y$, p, and its own secret random exponent x. (Actually $\beta$ will be set to be a hash of the DH group element $g^{yx}$, but we omit this detail for clarity). Conversely, when client B gets an ACK message with new state-token $\tau_2$ and its server's encrypted exponential $ENCk_B(g^x)$, it can compute the same session key $\beta$ from $g^x$, p, and y (B's secret random exponent).

In fact, the SSTP handshake procedure is broadly influenced by the TLS DHE_PSK key exchange, P. Eronen and H. Tschofenig, "Pre-Shared Key Cipher suites for Transport Layer Security (TLS),", IETF RFC4279, December, 2005, and TCP cookie transaction, P. Metzger, W. Simpson, and P. Vixie, "Improving TCP Security With Robust Cookies," USENIX Magazine, Vol. 34, No. 6, December, 2009. The main difference is that the servers preserve neither transport nor security state for clients through the use of state-token which is discussed next. Furthermore, compared with alternatives, SSTP performs connection establishment procedure combined with an AKE and thus overheads can be reduced.

State-Token and Secure Communications

Figure 2:
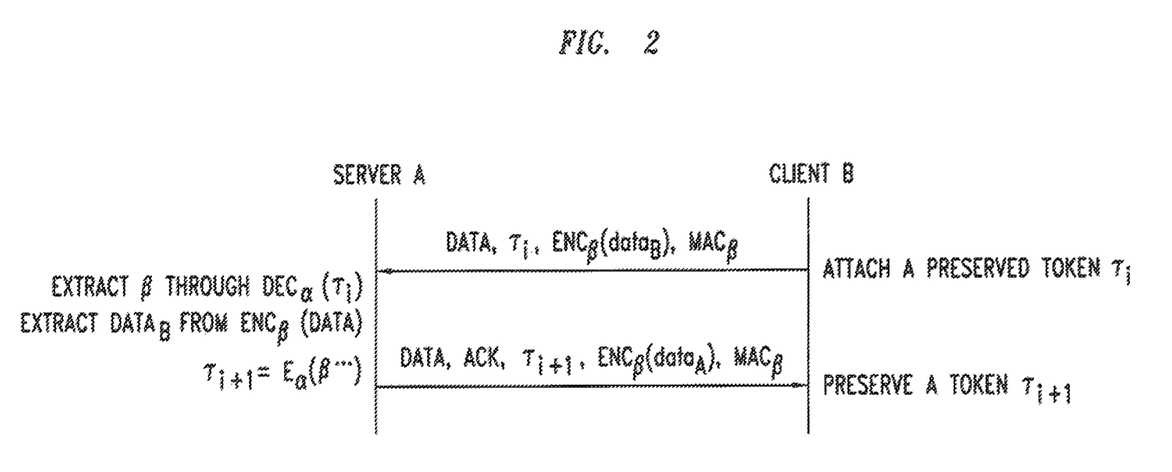
FIG. 2 shows an exemplary embodiment of a data transfer methodology for the transport protocol of the present invention.

In certain embodiments, a technique is used to effectively offload the state associated with the client to the client himself. At a high level, the idea is to encrypt and authenticate the state, and store it at the client. We realize this as illustrated in FIGS. 1 and 2. First, the server will maintain a set of separate symmetric keys $tk_{id}$, securely derived from each client's id (e.g., $tk_{id} = AES_k$ ("tokenkey", id)), for the purpose of this encryption/authentication. Further, upon being about to send an ACK message to a client, the server encrypts and authenticates with $tk_{id}$ the state (session key, time stamp, client's id, and counter) of our protocol's association, and thus obtains a state token. This state token is then sent to the client and then erased from the server together with session state. The client, upon receipt of the token, stores it, and includes it verbatim in the client's next message to the server. Note that the most-recent preserved state token can only be appended to new messages but not to retransmission messages which must include old state-tokens they originally included. We emphasize that the (encrypted) state token is not further encrypted, in contrast with the rest of the client's message, so that the server can decrypt the state token and restore the session state. Upon receipt of the client's message, the server first extracts, decrypts, and verifies integrity of the state token. Upon successful verification or authentication, the server restores the session state which was stored on or within the token, and processes the client's message as usual. Again, upon termination of the message processing, the server repeats the above procedure.

On the client side, messages are encrypted and authenticated using a session key $\beta$ computed by the AKE. On the server side, if the state-token verification passes, we can extract the following from the state-token using a key $tk_{id}$: session key $\beta$, token issue time $TS_i$, client's id id, and counter, $N_i$. Then, the message can be further processed if all the following conditions hold: (1) the source of message equals to id, (2) the message's sequence number is greater than or equal to $N_i$, and (3) $TS_i$ is less than current time and not beyond an age limit.

Reliability and Latency

For scalability, in one embodiment of the invention, a server has one receiving buffer across all its clients and also no sending buffer. Recall that sensor data from clients is continuously being sent to a server, while management commands are rarely sent by the server to clients. A client can send a new message immediately after the message stamped with current time is written to the client's sending buffer. In the sending buffer, acknowledged messages are removed while unacknowledged messages during a given time period are resent using random back-off timers to avoid retransmission flooding. Thus, lost messages to the server can by design be recovered in SSTP, while lost messages to clients cannot be recovered. Reliable message delivery to clients can be implemented at the applications level, as would be understood by persons skilled in the art. In the face of persistent server failures, clients can establish new secure connections with an alternative server. As would also be understood by a person skilled in the art, other buffering arrangements for the client and server are also possible.

From the latency perspective, a client can immediately send messages without any delay unless its sending window is full. In contrast, messages to clients are delayed to enable piggybacking on acknowledgements to clients. Each client's sending window size is determined by the number of the clients per server as the server expects its clients to evenly reduce their window size when it has to serve more than an expected number of clients.

Security and Overhead

We now recap the security of SSTP, where much of the security argument appears within the discussion of the protocol design. First, the long-term key generation is secure due to the properties of PRFG. The follow-up AKE, certain embodiments of which are chosen from the literature and standards, is also secure. Finally, the composition of the post-AKE secure session protocols with server offloading is secure if replay attacks are eliminated.

From the view point of computation and memory overhead, we compare SSTP to TLS over TCP (referred to as TLS hereafter). Consider two types of TLS client-server associations: long-lived and short-lived. For the former, each client keeps an association with its server during the lifetime of a secure transport connection. For the latter, it establishes a connection to its server to deliver a message and terminates the connection after message delivery. For a simple comparison, consider a large N-meters network where each meter (client) sends sensed data to its data collector (server) in a certain time interval $\lambda$. Assume that the security and transport state per client consumes L memory space in a server.

Short-lived TLS has high computation overhead for control, since it repeatedly sets up a new connection per data every $\lambda$, processes one data item, and deletes the connection. Seventeen control messages are required to deliver the data (12 for client authenticated TLS establishment and 5 for TCP establishment and finish). This implies that short-lived TLS servers severely use CPU, memory, and network resources just for processing control messages, if $\lambda$ is small. On the other hand, long-lived TLS servers need O(NL) memory space to maintain security-transport state for clients and also extra computation overhead to look up one corresponding state across O(N) state. It means that long-lived TLS servers excessively use memory and also consume CPU resources for the state lookup if $\lambda$ is large. Comparatively, SSTP servers have no overhead in computation or memory usage as observed in alternatives irrespective of $\lambda$ and N because of stateless design. The overhead shown in SSTP is state-token processing done per data received, which is not higher than the state lookup of long-lived TLS. From the communication aspect, SSTP clearly outperforms short-lived TLS exchanging control messages every λ, and is similar to long-lived TLS since the header size of the SSTP is comparable to that of TLS. We stress that in SSTP, clients do not by design send connection requests in the face of temporal server failures, compared to alternatives where clients develop SYN flooding by sending the requests within a time boundary.

Network Delay

We consider a congestion-free network expected in smart grid data collection. However, this assumption is less favorable for SSTP; in a congested network we expect the performance of SSTP to be further improved relative to TLS. In the future, we plan to test the performance of SSTP under network congestion.

For a Simulation Setting, we measure the end-to-end delay of TCP Reno and SSTP under ns-2 simulation settings summarized in Table II. A data source, representing a sensing node, continuously injects 512 byte packets into the network in a periodic interval. As HSPA or WiMAX are expected to be used for smart-grid access network technology, results of speed test in Chicago October 2010 are used for this simulation setting: topology 1 represents ATT HSPA and topology 2 represents Clearwire WiMAX. TCP Reno is compared against SSTP because showed that TCP Cubic (the "better" TCP variant) is outperformed by TCP Reno in terms of delay. Note that this evaluation assumes that there is no loss, drop, and reordering of messages. Thus this simulation focuses on the effect of network delay and is free of the adverse consequences of congestion control schemes and in-order sequence service.

TABLE II

NS-2 SIMULATION SETTINGS.

| Network settings | TCP Reno vs SSTP | |
| --- | --- | --- |
| Uplink Speed | 278 kbps [topology 1] | 1 Mbps [topology 2] |
| Uplink Delay | 240 ms | 120 ms |
| Downlink Speed | 2.8 Mbps | 6 Mbps |
| Downlink Delay | 160 ms | 80 ms |
| TCP Specific settings | 536B MSS, 64 KB RX Buffer. and 40 ms Delayed Ack. | |
| Sensing Data Size | 512 Byte Data over uplinks, ACK over downlinks | |
| Data Injection Speed | 10 ms-250 ms (441.6 kbps-1.76 kbps) | |
| Simulation Duration | 3 minutes after steady state | |

Figure 3:
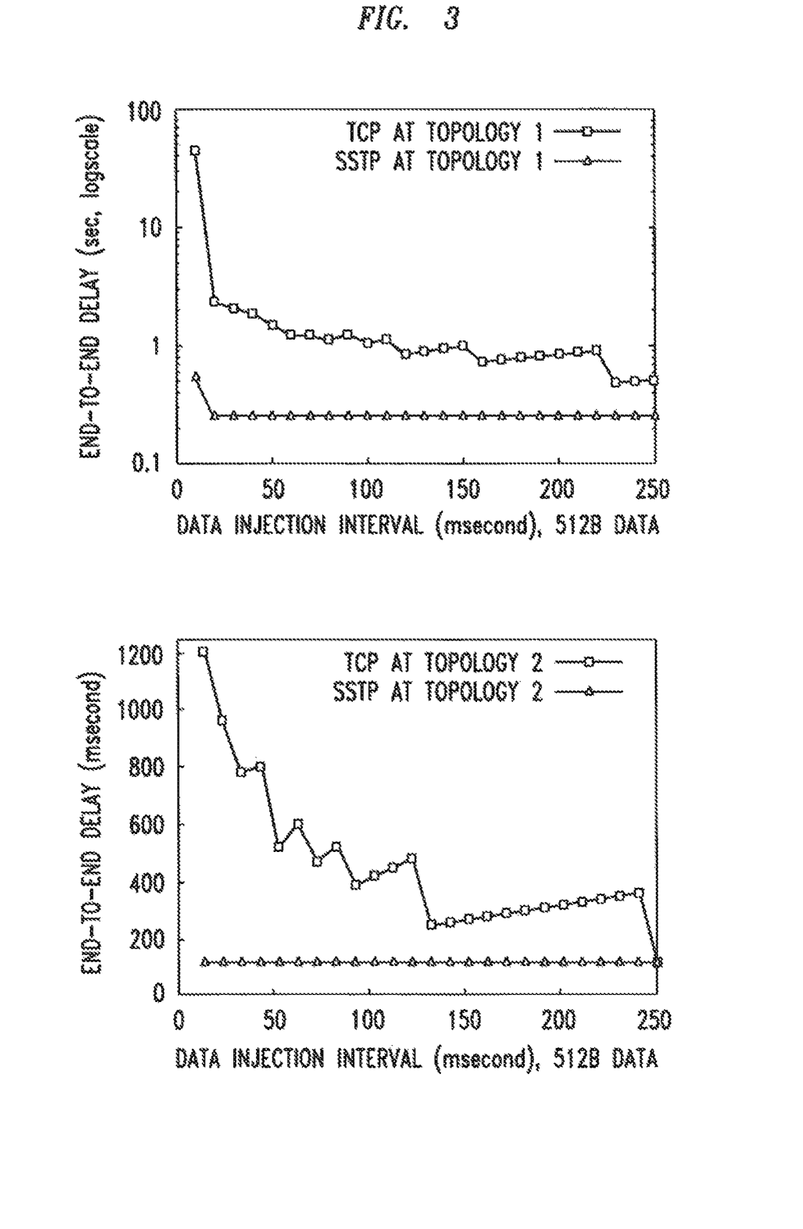
FIG. 3 shows average end-to-end delay comparisons for the transport protocol of the present invention as compared with other protocols.

The Simulation results are as follows. As expected, SSTP outperforms TCP across the topologies described in Table II. FIG. 3 represents average end-to-end delays of SSTP and TCP as a function of constant bit-rate workloads. SSTP keeps pace with the physical link speed under all settings except a 10 ms data injection interval and 278 kbps bandwidth. In contrast, TCP always shows larger end-to-end delay than RTT under conditions where the data injection interval is smaller than RTT. In this evaluation, we notice two properties of TCP. First, TCP's end-to-end delay is extremely high, about 46 sec when the network bandwidth is not sufficient for transmission, as shown in FIG. 3. Second, with enough bandwidth, network delay dominates TCP's end-to-end delay. Interestingly the simulation result on topology 2 shows that TCP is comparable to SSTP in large data injection intervals.

Based on our observation, we see that TCP works well only under the following conditions: Before the size of the unacknowledged sending window reaches a congestion window limit, the ACK is always returned to the sender and then data is pushed from an application. Namely, when the data injection interval is greater than RTT, and data is contained in one TCP MSS, TCP's end-to-end delay is close to a one-way time from a sender to a receiver, due to the always-open congestion window. Otherwise, TCP shows the sensitivity to both data injection interval and RTT (varies on media and routing between communicating pairs). For example, under the condition where the data injection interval is greater than round trip timeout (RTO) value (minute scale), TCP's end-to-end delay is at least RTT without packet drop, if the packet size is more than one TCP MSS, and at least the RTO value, even on single a packet drop, irrespective of the packet size. In contrast, in terms of delay, SSTP works well and is independent of the data injection interval and network settings.

We now discuss how we protect the server from replay attacks, since the SSTP server is essentially stateless. First, we note that server's secret-key based authentications of the state-tokens are un-forgeable and with proper formatting and care one can prevent the adversary from presenting a state-token generated for a client id1 as a state token for client id2. Further we will use deterministic encryption, such as AES, so re-encrypting a state-token without knowledge of a secret key is not possible either. Hence, the only venue of the replay attack is the verbatim replay of one of a previously generated state token with a possibly different session message. We observe that the session message is implicitly tied with the state token, since the session message (due to the necessary replay protection inside secure session protocols) is cryptographically tied with the client's and server's states, and thus with the state token. Thus, the only replay attack that remains to be considered is the verbatim replay of the entire client's message. A system as so far discussed is possibly vulnerable to this attack. We now discuss our protection technique. First, a server will reject "obviously old" messages through checking the token issue time contained in a state-token. Still, we need to efficiently address the possibility of replay of "not obviously too old" messages, which might be up to several tens of seconds old (to allow for clock skew). Our observation is that the number of messages that can arrive in this time period of tens of seconds is not very large, and therefore we can afford to keep the history of their hashes. For each new message, we will check it against a small recent history of hashes, and reject it if it is found in the history; if not found, we proceed as before. One optimization that may be implemented is the use of Bloom filters to greatly reduce the hash table size, and to speed up the hash checks.

Figure 4:
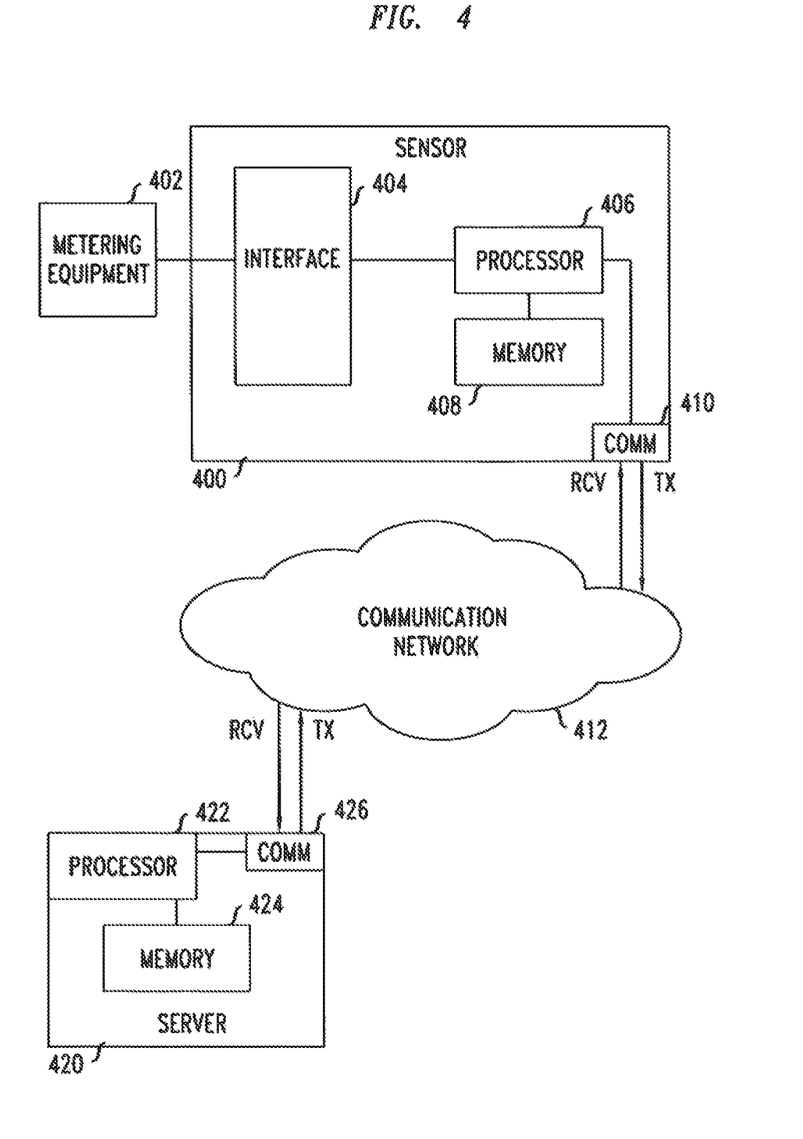
FIG. 4 shows one exemplary embodiment of a high level block diagram of a sensor and server for use in accordance with the methodology of the present invention.

Referring to FIG. 4, there is shown one exemplary embodiment of a sensor 400 and a server 420 as may be used in connection with certain embodiments of the present invention. As shown, the sensor 400 includes a processor 406 and memory 408 (for example, a suitable amount of read only memory (ROM) and random access memory (RAM). As described earlier, the processor and memory may take the form of a microcontroller, for example, one of the TI (Texas Instruments) MSP 430 series microcontrollers. As would be understood, the sensor memory 408 may be programmed with executable code for carrying out the methodology of the present invention as described. The processor 406 is coupled to a metering interface 404 that may include circuitry for interfacing with existing metering equipment. In addition, the processor also couples to a communications interface that in turn couples to a communications network 412. In this manner, metering data from metering equipment 402 may be obtained and transmitted via the communications network to a corresponding server 420 of the respective utility. As would be understood by a person skilled in the art, the sensor may separately couple to the metering equipment as shown, or may be integrated with the metering equipment itself. In addition, other varying embodiments of sensor design and functionality may also be utilized as would be readily understood.

As illustrated, server 420 also includes a processor 422 and associated memory 424. The memory is programmed with executable code in order for the server to carry out the methodology of the present invention as well as other well understood server tasks for a server of this type. The server 420, in addition, includes a communications interface 426 to the communications network 412. The communications interface may include multiple ports and suitable buffering capability, as would be understood by those skilled in the art.

Related Work

Relevant to our work is the body of recent research that has examined end-to-end transport solutions over power line communications M. Bauer, W. Plappert, C. Wang, and K. Dostert, "Packet-Oriented Communication Protocols for Smart Grid Services over Low-Speed PLC," IEEE PLC and Its Applications, March, 2009 and RF mesh networks J. Paek and R. Govindan, "Rate-Controlled Reliable Transport Protocol for Wireless Sensor Networks," ACM SENSYS, November 2007. We can conclude from this literature that existing transport solutions are not suitable for smart grid sensor data collection, which relies on millisecond to minute scale measurements: average delay between PLC slaves (meters) and a PLC master is about 10 minutes even in a 100-nodes network. Up to one hour delay was observed in a RF mesh network. More importantly, these prior solutions do not address scalable end-to-end security extensions. Alternative directions are split-aggregation concepts, where high-powered intermediate nodes aggregate data and effectively respond to congestions through a hop-by-hop delivery scheme, and so retransmissions are reduced. Under the condition where congestion is rare, the impact of these alternatives is confined to RTT reduction. However, the main concern with this approach is that the end-to-end security can be hurt since the split-aggregation requires TLS or IPSec sessions to be terminated at intermediate nodes. We stress that SSTP can be directly applied to the split-aggregation model after minor modifications.

Conclusion

Emerging smart grid networks are expected to have massive amounts of data continuously generated from various measuring devices (intelligent sensors, advanced meters, electric vehicle charging stations) which are embedded in the power grid. Data generated from these measuring devices must be delivered securely and reliably to utility control centers for wide-area monitoring and control and to estimate the overall grid status in a timely and precise manner. The collected data is also used for incentivizing consumer participation for improving power stability. Transport protocol requirements for such periodic grid measurement data are characterized as lifetime-lived, secure, and reliable delivery of short flows (usually less than 1.5 KB) over utility-Wide Area Networks (WANs). However, our survey shows that there is no well-known transport protocol that can support the above characteristics in a scalable and light-weight manner.

Motivated by this, we design a scalable and secure transport protocol, SSTP, exploiting the notion of a "State-token" which is issued with each server message and which is subsequently attached to corresponding client message delivered to the server. Compared with existing well-known transport and security schemes, SSTP enables scalable server deployments as servers do not keep state (for security and communication) per client and thus computation/memory overheads are significantly reduced.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all to examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Many other modifications and applications of the principles of the invention will be apparent to those skilled in the art and are contemplated by the teachings herein. Accordingly, the scope of the invention is limited only by the claims.

What is claimed is:

1. A method of secure communication for executing a session between a client and a server in a communications network, said method comprising the steps of:
   sending a session connection request from said client to said server;
   receiving from said server an acknowledgement message, said acknowledgement message including a state token representing a state of association between said client and said server, said state token being encrypted and authenticated by said server;
   communicating from said client to said server utilizing said state token, wherein said state of association between said client and said server is stored temporarily at said client and not maintained at said server, said state token being utilized in communications from said client to said server to enable said server to verify and restore session state between said client to thereby process messages from said client, wherein a token master key is available to said server and not said client and wherein said communicating from said client to said server utilizing said state token is in an encrypted state based on said token master key.

2. The method of claim 1, wherein a server maintains a set of separate symmetric encryption keys, further including:
   said server authenticating one of said set of separate encryption keys with said state association with a particular client to thereby obtain said state token.

3. The method of claim 2, wherein said state of association includes a session key, time stamp, client id, and counter.

4. The method of claim 2, wherein said set of separate symmetric encryption keys are derived from an identification of a client.

5. The method of claim 1, further including the steps of:
   upon receipt of said acknowledgement message by said client, generating a set of numbers p, g, and exponential $g^x$, wherein said set of numbers are encrypted with PSK $k_B$ and returned to said server with said state token during said step of communicating.

6. The method of claim 5, further including:
   upon receipt of said connection request message at said server, said server decrypting said set of numbers using PSK $k_B$ and further computing a symmetric session key $\beta = g^{yx} \bmod p$ from $g^y$, p, and its own random exponent x.

7. The method of claim 6, further including
upon receipt of said acknowledgement message at said client with a new state token $\tau_2$ and an encrypted exponential $ENCk_B$ ($g^x$) of said server, computing by the client the session key $\beta$ from $g^x$, p, and y.

8. The method of claim 7, wherein messages between said client and said server during a connection establishment phase are protected by a message authentication code (MAC), computed with the PSK $k_B$ on the corresponding message.

9. The method of claim 8, wherein pre shared keys (PSK) are pseudo-randomly generated from a master key k of said server, wherein given a server's master key k, for a client with identity id, a long-term key $k_{id}=ENC_k$ (id).

10. The method of claim 1, wherein said communications network is for a utility.

11. The method of claim 1, wherein a most-recent preserved state token is appended to new messages but not to retransmission messages which include old state-tokens originally included.

12. A client apparatus for providing secure communication for executing a session with a server in a communications network, said apparatus comprising:
a communications interface for enabling said client apparatus to communicate over a communications network; and
a physical processor which when programmed with executable program code is operable to:
send a session connection request to said server;
receive from said server an acknowledgement message, said acknowledgement message including a state token representing a state of association between said client and said server, said state token being encrypted and authenticated by said server;
communicate from said client to said server utilizing said state token, wherein said state of association between said client and said server is stored temporarily at said client and not maintained at said server, said state token being utilized in communications from said client to said server to enable said server to verify and restore session state between said client to thereby process messages from said client, wherein a token master key is available to said server and not said client and wherein communication from said client to said server utilizing said state token is in an encrypted state based on said token master key.

13. The apparatus of claim 12, wherein upon receipt of said acknowledgement message by said apparatus, a set of numbers p, g, and exponential $g^x$ is generated, wherein said set of numbers are encrypted with PSK $k_B$ and returned to said server with said state token during said step of communicating.

14. The apparatus of claim 13, wherein upon receipt of said acknowledgement message at said apparatus with a new state token $\tau_2$ and an encrypted exponential $ENCk_B$ ($g^x$) of said server, a session key $\beta$ from $g^x$, p, and y is computed.

15. The apparatus of claim 14, wherein messages between said apparatus and said server during a connection establishment phase are protected by a message authentication code (MAC), computed with the PSK $k_B$ on the corresponding message.

16. The apparatus of claim 15, wherein pre shared keys (PSK) are pseudo-randomly generated from a master key k of said server, wherein given a server's master key k, for a sensor apparatus with identity id, a long-term key $k_{id}=ENC_k$ (id).

17. The apparatus of claim 12, wherein said state of association includes a session key, time stamp, client id, and counter.

18. A server apparatus for providing secure communication for executing a session with a client in a communications network, said apparatus comprising:
a communications interface for enabling said sensor apparatus to communicate over a communications network; and
a physical processor which when programmed with executable program code is operable to: receive a session connection request from said client;
send an acknowledgement message, said acknowledgement message including a state token representing a state of association between said client and said server, said state token being encrypted and authenticated by said server;
receive a communication from said client to said server utilizing said state token, wherein said state of association between said client and said server is stored temporarily at said client and not maintained at said server, said state token being utilized in communications from said client to said server to enable said server to verify and restore session state between said client to thereby process messages from said client, wherein a token master key is available to said server and not said client and wherein communication from said client to said server utilizing said state token is in an encrypted state based on said token master key.

19. The apparatus of claim 18, wherein upon receipt of a connection request message at said server apparatus, said server apparatus is operable to decrypt said set of numbers using PSK $k_B$ and further computing a symmetric session key $\beta=g^{yx}$ mod p from $g^y$, p, and its own random exponent x.

20. The apparatus of claim 19, wherein pre shared keys (PSK) are pseudo-randomly generated from a master key k of said server apparatus, wherein given a server's master key k, for a client with identity id, a long-term key $k_{id}=ENC_k$ (id).

* * * * *